(12) United States Patent
Dowty

(10) Patent No.: US 8,376,306 B2
(45) Date of Patent: Feb. 19, 2013

(54) ANTI-RATTLE TRACK FASTENER

(75) Inventor: Mark Brian Dowty, Rural Hall, NC (US)

(73) Assignee: BE Aerospace, Inc., Wellington, FL (US)

( * ) Notice: Subject to any disclaimer, the term of this patent is extended or adjusted under 35 U.S.C. 154(b) by 538 days.

(21) Appl. No.: 12/162,043

(22) PCT Filed: Jan. 30, 2007

(86) PCT No.: PCT/US2007/061278
§ 371 (c)(1),
(2), (4) Date: Jan. 13, 2009

(87) PCT Pub. No.: WO2007/133823
PCT Pub. Date: Nov. 22, 2007

(65) Prior Publication Data
US 2009/0302665 A1    Dec. 10, 2009

Related U.S. Application Data

(60) Provisional application No. 60/766,588, filed on Jan. 30, 2006.

(51) Int. Cl.
*A45D 19/04* (2006.01)

(52) U.S. Cl. .............. 248/429; 248/503.1; 410/104; 410/105

(58) Field of Classification Search ............ 296/1.03; 297/463.1; 248/429, 501, 503; 410/105; 411/70
See application file for complete search history.

(56) References Cited

U.S. PATENT DOCUMENTS

| 2,408,560 | A | * | 10/1946 | Keehn | 411/344 |
|---|---|---|---|---|---|
| 2,779,092 | A | | 1/1957 | Gordon | |
| 3,709,088 | A | * | 1/1973 | Pitzer | 411/70 |
| 4,109,891 | A | * | 8/1978 | Grendahl | 248/503.1 |
| 4,213,593 | A | * | 7/1980 | Weik | 248/501 |
| 4,277,043 | A | * | 7/1981 | Weik | 248/503.1 |
| 4,376,522 | A | * | 3/1983 | Banks | 248/503.1 |
| 4,500,020 | A | * | 2/1985 | Rasor | 224/321 |
| 4,911,348 | A | * | 3/1990 | Rasor et al. | 224/321 |
| 5,183,313 | A | * | 2/1993 | Cunningham | 297/344.1 |
| 5,492,258 | A | * | 2/1996 | Brunner | 224/321 |
| D395,388 | S | * | 6/1998 | Bourne et al. | D8/338 |
| 5,947,356 | A | * | 9/1999 | Delong | 224/404 |
| 6,260,813 | B1 | * | 7/2001 | Whitcomb | 248/503.1 |
| 6,299,230 | B1 | * | 10/2001 | Oettl | 296/65.03 |
| 6,902,365 | B1 | * | 6/2005 | Dowty | 410/105 |
| 6,959,844 | B2 | * | 11/2005 | Potter et al. | 224/321 |
| 6,971,826 | B2 | * | 12/2005 | Valentine | 410/50 |
| 7,029,215 | B2 | * | 4/2006 | Dowty | 410/105 |
| 7,559,716 | B2 | * | 7/2009 | Ganter | 403/322.4 |
| 2003/0095846 | A1 | * | 5/2003 | Breckel | 410/104 |

(Continued)

*Primary Examiner* — Terrell McKinnon
*Assistant Examiner* — Daniel J Breslin
(74) *Attorney, Agent, or Firm* — Shumaker, Loop & Kendrick, LLP

(57) ABSTRACT

An anti-rattle track fastener assembly for attaching a fixture to a vehicle that has a track formed therein. The track includes upper walls that form a longitudinally-extending slot. Spaced-apart segments extend from the upper walls into the slot to provide undercut areas in the slot positioned under the segments. Spaced-apart openings are positioned between the segments. The fastener assembly includes a stud that extends from the fixture and is dimensioned to be received within the slot for engaging the spaced-apart segments. The fastener also includes an eccentrically-mounted cam movable between a first position and a second position. When the cam is in the first position, the stud can engage the spaced-apart segments with clearance, and when the cam is in the second position, the stud can tightly engage the spaced-apart segments.

5 Claims, 5 Drawing Sheets

U.S. PATENT DOCUMENTS

| | | | |
|---|---|---|---|
| 2004/0131439 A1* | 7/2004 | Womack et al. | 410/104 |
| 2005/0180836 A1* | 8/2005 | Dowty | 410/105 |
| 2007/0025822 A1* | 2/2007 | Alexander | 410/104 |
| 2007/0253762 A1* | 11/2007 | Hudson | 403/83 |

* cited by examiner

ANTI-RATTLE TRACK FASTENER

CROSS-REFERENCE TO RELATED APPLICATIONS

This application is a national stage application of International Application No. PCT/US2007/061278, filed on Jan. 30, 2007, which claims priority to U.S. Provisional Patent Application No. 60/766,588 filed on Jan. 30, 2006, the entire disclosures of which are incorporated herein.

BACKGROUND OF THE INVENTION

This invention relates to a track fastener assembly of the type used to anchor seats or cargo to tracks fitted to the floor of a vehicle. The particular embodiment disclosed herein is of a track fastener assembly for securing an aircraft passenger seating unit to the floor of an aircraft. Therefore, the vehicle referred to throughout this application is an aircraft. It is understood that the invention relates as well to other types of vehicles such as trains, buses, or the like.

Many aircraft require the capability to be differently configured to meet varying cargo and/or passenger-carrying requirements such as the removal or addition of passenger seats and/or cargo. In addition, aircraft also must have the capability to easily and quickly relocate or reposition seats and/or cargo. It is often necessary in aircraft to change the spacing between seats to increase or decrease the passenger density throughout a portion of or the entire aircraft. For example, it may be necessary to change the passenger density of a particular aircraft from its normal first class and coach density to an all-coach configuration such as might be necessary with charter operations. In addition, some aircraft, particularly those operating on late-night schedules, carry both passengers and cargo, the cargo being carried in one or more compartments normally used to carry passengers. Also driving this design is the need of aircraft manufacturers to speed their initial installation time, which is a major consideration on large aircraft with many seats.

To provide this capability, aircraft manufacturers install locking tracks that run fore and aft along the deck of the major compartments of the aircraft. These locking tracks have a slot that runs the entire length of the track along its top side. Enlarged cut-out openings are spaced at regular intervals along the length of the track to receive track fasteners to permit the track fasteners to be positioned along and locked into the track in order to secure passenger seats and/or cargo pallets that are themselves secured to the track fastener. These track fasteners are adjustable within the track, thereby permitting the seats and/or cargo to be repositioned or removed.

The locking tracks and track fasteners are both fabricated from metal materials. Even when tightly locked into place, adjacent metal parts can rattle, causing annoying disturbances within an aircraft cabin environment. In an effort to reduce rattling there may be a tendency to over-tighten the track fastener screws. This can potentially lead to damaged screws, stripped threads and jamming of the fastener that makes later removal difficult. Prior art anti-rattle devices include star-shaped washers that are threaded down onto the front stud shaft of the track fastener to lift the seat slightly off of the track and snug-up the front stud onto the bottom of the track surface. These washers are difficult and time-consuming to install, and require special tools.

The present invention quickly and efficiently locks the track fastener into its proper position, prevents rattling and vibration that causes irritating noise and may loosen the track fitting.

SUMMARY OF THE INVENTION

Therefore, it is an object of the invention to provide an anti-rattle track fastener assembly for a vehicle such as an aircraft, train, bus or the like.

It is an object of the invention to provide an anti-rattle track fastener assembly that is quickly and easily locked and unlocked when necessary to reposition the fastener.

It is another object of the invention to provide an anti-rattle track fastener assembly that is capable of being engaged to a locking track quickly, safely and securely.

It is another object of the invention to provide an anti-rattle track fastener assembly that does not require special tools.

It is another object of the invention to provide an anti-rattle track fastener assembly that does not interfere with or require attachment to the stud shaft of the track fastener.

According to one embodiment of the present invention, there is provided an anti-rattle track fastener assembly for attaching a fixture to a vehicle that has a track formed therein. The track includes upper walls that form a longitudinally-extending slot. Spaced-apart segments extend from the upper walls into the slot to provide undercut areas in the slot positioned under the segments. Spaced-apart openings are positioned between the segments. The fastener assembly includes a stud that extends from the fixture and is dimensioned to be received within the slot for engaging the spaced-apart segments. The fastener also includes a cam that has a tranversely-extending, eccentrically-positioned hole therethrough for mounting the cam to the fixture and is movable between a first position and a second position. When the cam is in the first position, the stud is engageable to the spaced-apart segments with clearance, and when the cam is in the second position, the stud is tightly engageable to the spaced-apart segments against movement of the fixture.

According to another embodiment of the invention, the cam also has a radially extending camming hole formed therein for receiving a tool for moving the cam between the first position and the second position.

According to yet another embodiment of the invention, the stud has a foot for engaging the spaced-apart segments formed on an end thereof.

According to yet another embodiment of the invention, the cam has a curved surface.

According to yet another embodiment of the invention, the cam has a flat surface portion.

According to yet another embodiment of the invention, the fastener assembly includes a foot formed on the stud for being received within the slot and the flat surface portion is dimensioned to engage the track when the cam is in the first position and the foot is received within the slot.

According to yet another embodiment of the invention, the cam is dimensioned such that the flat surface portion is positioned away from the track when the cam is in the second position and the foot is received within the slot.

According to yet another embodiment of the invention, the stud is dimensioned to be received within a sleeve.

According to yet another embodiment of the invention, the sleeve is dimensioned to be attached to the fixture.

According to yet another embodiment of the invention, the fixture is a seat for passengers within an airplane.

According to another aspect of the present invention, a method relating to an anti-rattle track fastener assembly for attaching a fixture to a vehicle is disclosed, including the step of providing a track having upper walls that form a longitudinally-extending slot and having spaced-apart segments that extend from the upper walls into the slot. The spaced-apart segments provide undercut areas in the slot positioned under the segments and spaced-apart openings positioned between the segments. The fixture includes a stud that extends from the fixture and is dimensioned to be received within the slot for engaging the spaced-apart segments. The fixture also includes a cam having a tranversely-extending, eccentrically-positioned hole therethrough for mounting the cam to the fixture. The cam is movable between a first position wherein the stud can engage the spaced-apart segments with clearance and a second position wherein the stud can tightly engage the spaced-apart segments. The fixture is positioned adjacent the track such that the stud extends into the slot and the cam is in the first position. The cam is then moved from the first position to the second position thereby wedging the cam into engagement with the upper walls of the track such that the stud is tightly engaged with the segments.

According to yet another embodiment of the invention the step of positioning the fixture adjacent the track such that the stud extends into the slot, includes the step of extending the stud through openings that are positioned between the segments.

According to yet another embodiment of the invention, the step of inserting a tool into a radially positioned hole that extends from the surface of the cam into the cam, wherein the tool is for performing the step of moving the cam from the first position to the second position.

BRIEF DESCRIPTION OF THE DRAWINGS

Some of the objects of the invention have been set forth above. Other objects and advantages of the invention will appear as the description of the invention proceeds when taken in conjunction with the following drawings, in which.

TECHNICAL FIELD AND BACKGROUND OF THE INVENTION

Figure 1:
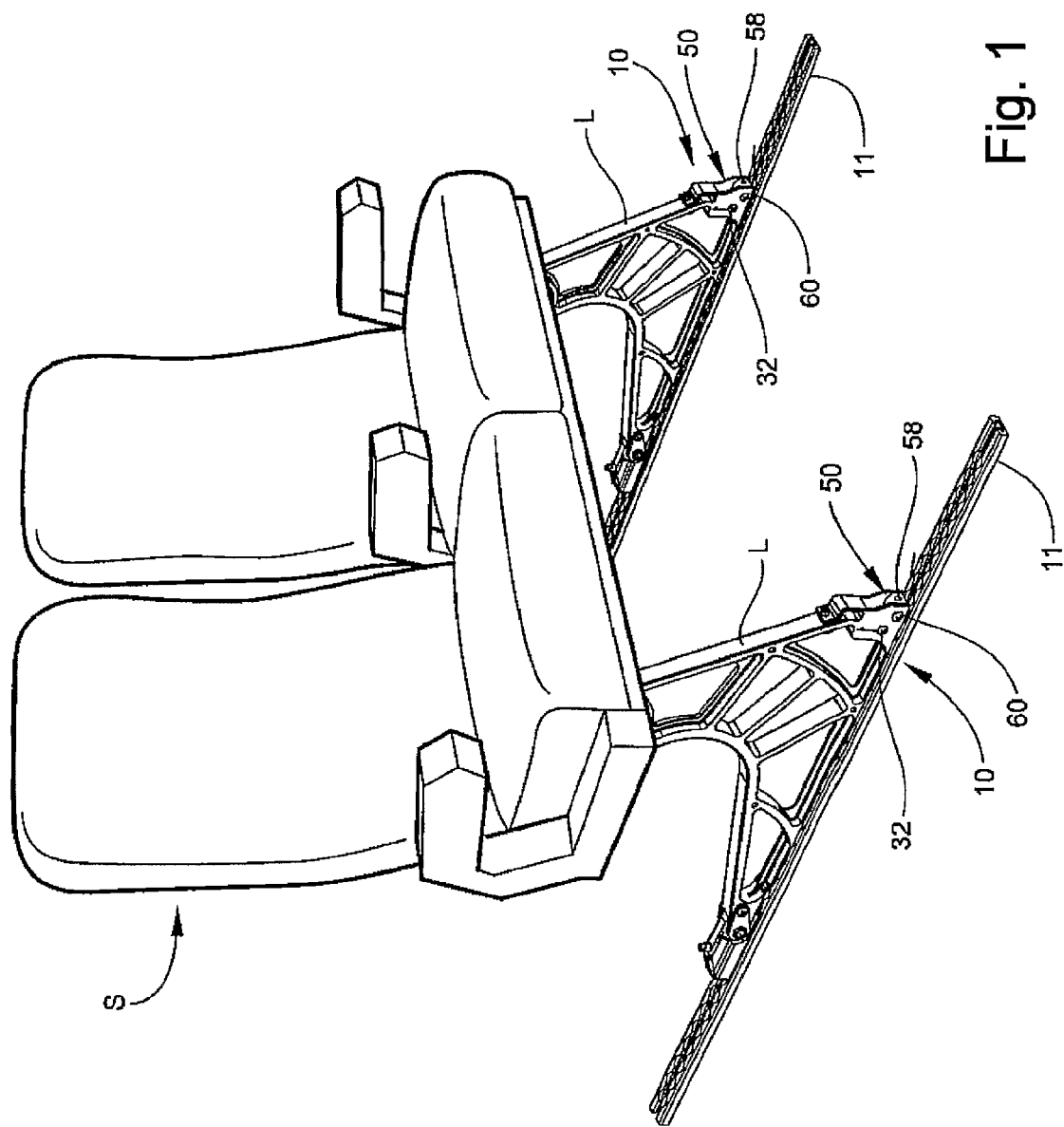
FIG. 1 is a perspective view of an aircraft passenger seat and locking track incorporating an anti-rattle track fastener.

Referring now specifically to the drawings wherein identical reference numerals denote the same elements within and among the various views, a typical seating arrangement using the track fastener assembly according to the present invention is illustrated in FIG. 1. A seating unit "S" is positioned on a locking track 11 and locked thereto by means of track fastener assemblies 10 mounted on the front end of the seat legs "L."

Figure 2:
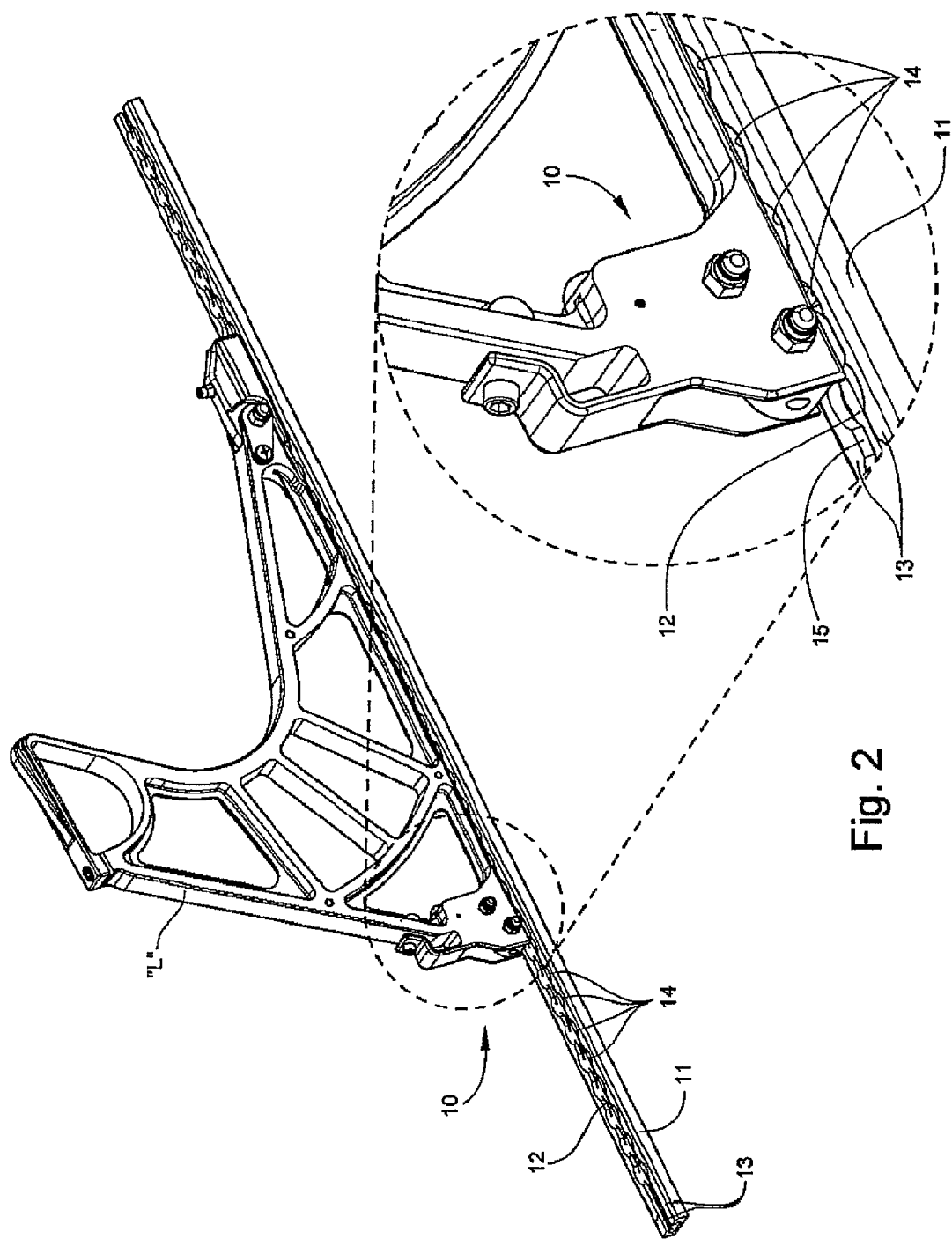
FIG. 2 is an enlarged fragmentary view of the leg of the seat and the anti-rattle track fastener.

Referring now to FIG. 2, locking track 11 has a longitudinally-extending slot 12 therein that extends along the entire length of the locking track 11. Upper walls 13 of the locking track 11 define the slot 12 and have regularly spaced-apart enlarged openings 14 along the length thereof, separated by relatively narrower track slot segments 15 that form the portions of the structure that actually perform the locking function. In FIG. 2 it is evident that the narrow track slot segments 15 extend into the slot 12 to provide undercut areas in the slot 12 beneath the slot segments 15. In contrast, the enlarged openings 14 have little or no undercut areas in the slot 12. The locking track 11 is attached to the floor of the aircraft, for example by machine screws that pass through screw holes, not shown, in the bottom of locking track 11.

Figure 3:
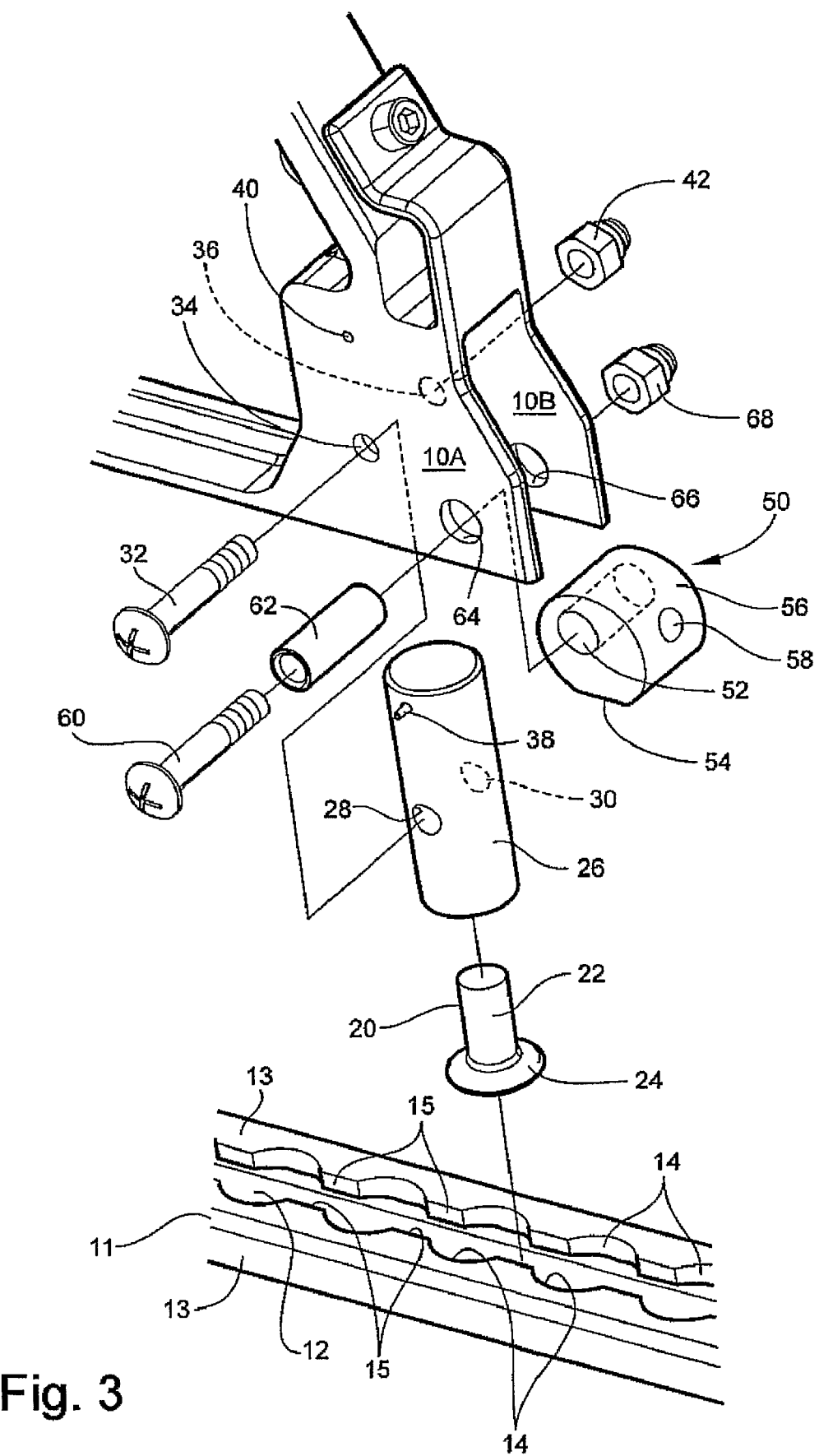
FIG. 3 is an exploded view of the track fastener.

Referring now to FIG. 3, the anti-rattle track fastener assembly 10 includes a track stud 20 having a stud shaft 22 and an enlarged locking foot 24. The stud 20 is mounted in a sleeve 26 that is positioned between sidewalls 10A and 10B of the track fastener 10. The stud 20 may be formed integrally with the sleeve 26, threaded or welded onto it, or the track stud may be screwed directly into the seat leg "L" by forming mating screw threads in the leg "L". Two diametrically-aligned screw holes 28 and 30 accept a screw 32 that is extended through screw holes 34 and 36 in the sidewalls 10A, 10B. The screw holes 28 and 30 are aligned with the screw holes 34, 36 by means of a guide pin 38 that fits into a small guide hole 40. The screw 32 is secured by a nut 42.

A cam 50 is positioned between the sidewalls 10A, 10B adjacent the stud 20. The cam 50 may be fabricated from any suitable material, such as plastics, resins or metals. One preferred embodiment if the cam 50 is fabricated from an unfilled or PTFE-filled acetal copolymer resin sold under the registered trademark Delrin®.

The cam 50 includes a transversely-extending, eccentrically-positioned screw hole 52, a flat surface portion 54, a curved surface portion 56 and a radially-extending camming hole 58. The cam 50 is mounted to the sidewalls 10A, 10B by a screw 60 positioned in a sleeve 62 and positioned in cam mounting holes 64, 66. The screw 60 is secured with a nut 68.

Figure 4:
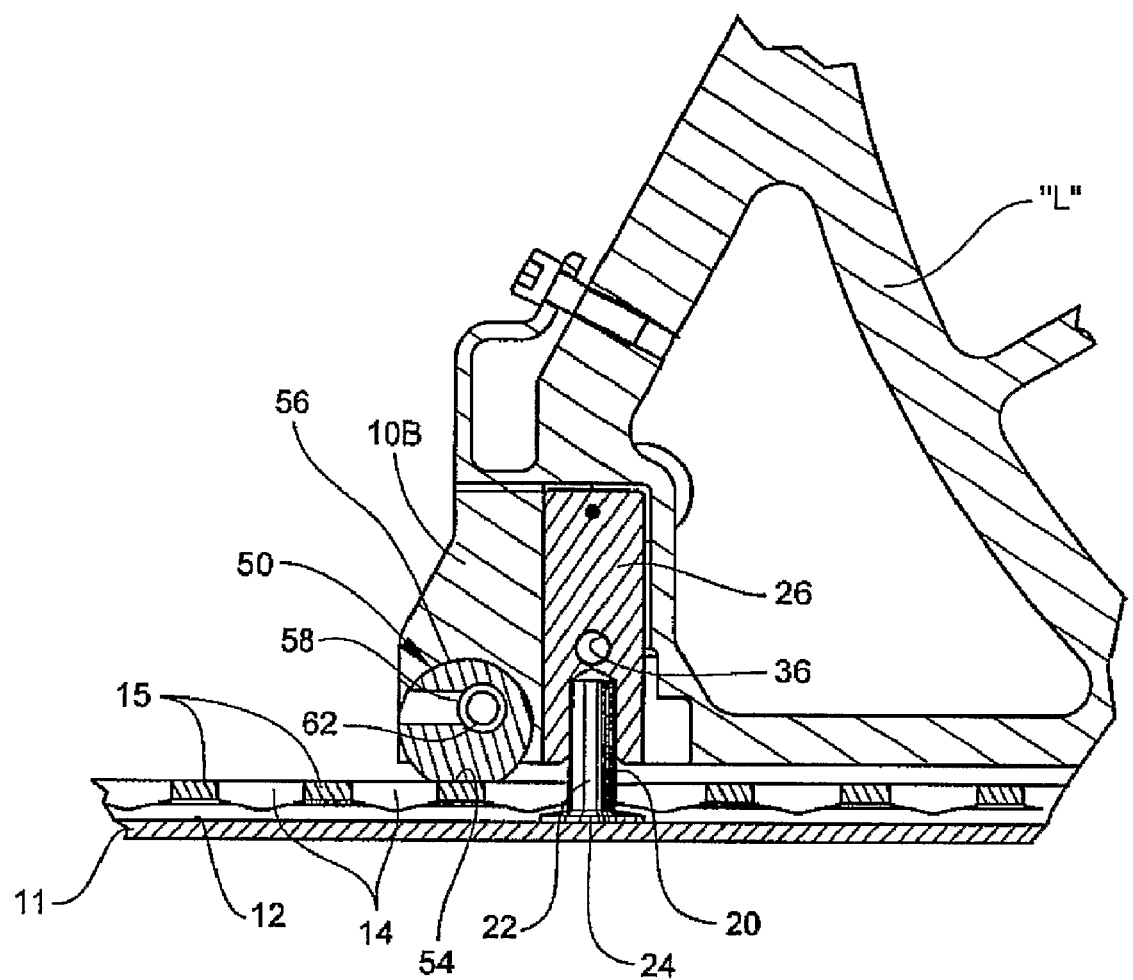
FIG. 4 is a cross-sectional view of the anti-raffle track fastener and an adjacent length of the locking track, showing the anti-rattle feature of the track fastener in an unlocked position.

Referring now to FIG. 4, the track fastener 10 is shown in the mounted position, with the foot 24 of the stud 20 positioned in the slot 12 and displaced from the opening 14 so that the stud 20 is retained the area of one of the relatively narrower track slot segments 15. Note at this point that there is a clearance between the top of the foot 24 and the upper walls 13 of the track 11. The cam 50 is positioned with the flat surface area 54 resting on the upper walls 13 of the track 11. The flat surface area 54 also acts to resist inadvertent disengagement of the cam 50 and disengagement without the use of a tool.

Figure 5:
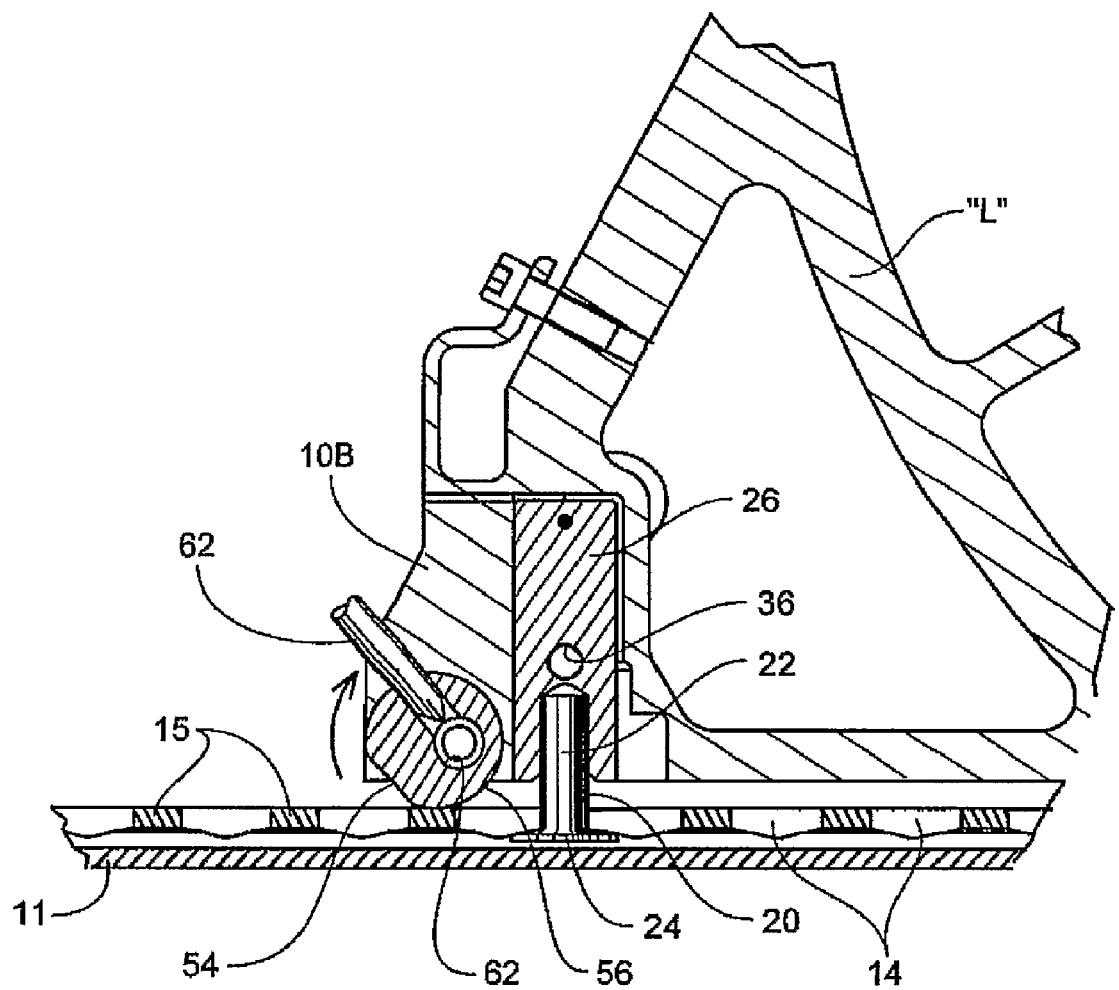
FIG. 5 is a cross-sectional view of the anti-rattle track fastener and an adjacent length of the locking track, showing the anti-rattle feature of the track fastener in a locked, anti-raffle position.

As is shown in FIG. 5, to engage the anti-rattling function of the track fastener 10, any suitably sized object, such as the shank 62 of a screwdriver, is inserted Into the camming hole 58 and used as a lever to rotate the cam 50. The cam 50 is rotated so that the flat surface area 54 is rotated away from engagement with the upper walls 13 of the track 11. In this manner the curved surface portion 56 is wedged into engagement with the upper walls 13 of the track 11. The eccentric position of the screw hole 52 and the curved surface portion 56 causes the stud 20 to be raised upwardly as the cam 50 is rotated, wedging the foot 24 of the stud 20 into a tight engagement with the upper walls 13 of the track 11. This can be accomplished very quickly during installation of the seat "S" without any special tools. For example, the camming hole 58 can be sized to accept the shank 62 of the screwdriver used to tighten the screws 32 and 60. The acetal copolymer resin of the cam 50 has a slight degree of compressibility that allows a secure engagement between the cam 50 and the track 11, while the low CF of the acetal copolymer resin allows the cam 50 to be relatively easily rotated between the positions shown in FIGS. 4 and 5.

As is apparent from the foregoing, the novel feature of the invention is the use of a cam to wedge the foot 24 of the stud 20 into a tight, non-rattling engagement with the track 11. Thus, many variations in the structure of the track, track stud and associated hardware are possible. For example, the cam may be fore or aft of the track stud and may or may not have a flat side. Eccentric mounting of the cam may provide adequate force on the track, and other means may be used to prevent inadvertent movement of the cam out of the anti-rattle position.

An improved aircraft passenger seat anti-rattling track fastener is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

I claim:

1. An anti-rattle track fastener assembly for attaching a fixture to a track having a longitudinally-extending slot defining alternating openings and segments, the fastener assembly comprising:
- a sleeve fixed relative to the fixture and having a stud therein having a foot formed on an end thereof, the stud extending vertically from the sleeve and dimensioned to be received through the openings of the slot with the foot engaging the underside of the segments;
- a cylinder-shaped cam directly urging against the track, the cam defining a flat surface portion on its circumference and an opening eccentrically positioned through its parallel faces, the cam further having a radially extending camming hole formed therein through a curved portion of its circumference for removably receiving a tool, the camming hole being substantially concealed between sidewalls of the fixture; and
- the fixture substantially concealing the sleeve and the cam, the fixture pivotably supporting the cam separate from and adjacent to the sleeve such that the cam is pivotable between a first position wherein the flat surface portion of the cam is engaged with the track and the foot is disengaged from the track, and a second position wherein a curved exterior surface of the cam is engaged with the track and the foot is engaged with the track.

2. An anti-rattle track fastener assembly according to claim 1, wherein the foot is disengaged with the underside of the segments when the cam is in the first position, and engaged with the underside of the segments when the cam is in the second position.

3. An anti-rattle track fastener assembly according to claim 1, wherein the stud and the sleeve are axially aligned.

4. An anti-rattle track fastener assembly according to claim 1, wherein the sleeve and the cam are positioned side-by-side along the length of the track.

5. An anti-rattle track fastener assembly according to claim 1, wherein the fixture is carried by an aircraft passenger seat.

* * * * *